Aug. 31, 1948.  W. P. MUSE  2,448,232
EXTENSIBLE PIPE UNION
Filed Dec. 13, 1944

Inventor
William P. Muse,
By Emory L. Groff
Attorney

Patented Aug. 31, 1948

2,448,232

UNITED STATES PATENT OFFICE 2,448,232

EXTENSIBLE PIPE UNION

William P. Muse, Odin, Ill.

Application December 13, 1944, Serial No. 567,908

4 Claims. (Cl. 285—199)

This invention relates to extensible pipe unions and means for effectively sealing the same.

While extensible pipe couplings for joining together sections of pipe are known to the plumbing art and the like, nevertheless such couplings are usually intended and constructed so as to seal in fluids under relatively low pressures as compared with the high pressures developed in oil and gas pipe lines leading from oil wells for example. Moreover, in oil and gas pipe lines where high pressures are likely to be encountered, it is often difficult to move or shift sections of long strings of pipe into meeting relation to effect connection by the usual couplings.

Accordingly, one of the objects of the invention is to provide a novel extensible pipe union, which will permit of effectively and easily connecting the gap between otherwise unbridgable pipe sections, and also seal in a fluid under extremely high pressure at the extensible parts thereof.

Another object of the invention is to provide an extensible threaded pipe union including novel gland-type means for sealing the end of one of the telescoped union sections after they have been finally adjusted and coupled to the spaced ends of the pipe sections to be joined together.

A further object is to provide a novel system for sealing the extensible portions of the union by forcing a sealing compound in and about the inter-engaging threads of the union so as to maintain a high pressure seal following and during each adjustment thereof, prior to adjusting the gland-type sealing means.

Other objects and advantages of the present invention will more fully appear as the description proceeds in conjunction with the accompanying drawings, wherein one embodiment of the invention is illustrated.

Figure 1:
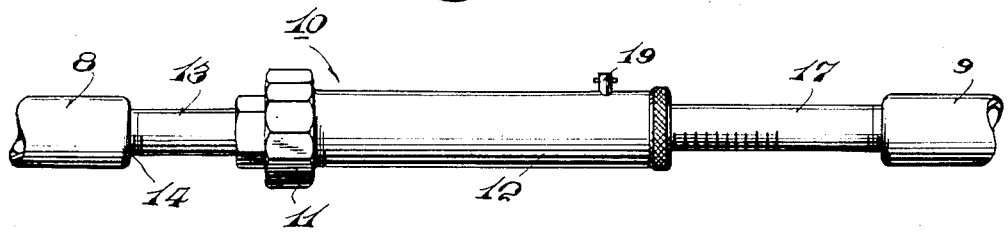
Figure 1 is a side elevation of the improved extensible union as it appears externally when coupled and sealed together between two pipe sections.

Referring to the drawings, and first with particular reference to Figure 1, the pipe sections to be connected are designated as 8 and 9. Also, there is shown a pipe union 10, which includes a coupling nut 11 carried by a novel sleeve element 12 and cooperating with a nipple 13, the end of the sleeve and the end of the nipple being in abutting relation in the nut 11, and the nipple 13 being provided with threads 14 for connecting with the internal threads of the pipe section 8.

The elongated internally threaded sleeve section 12 at its end opposite to the union 10 is chamfered to form an inwardly tapering annular seat 15. This seat is engaged by a gasket 16 adjustably mounted on the exteriorly threaded surface 18 of a pipe section 17, the latter being adapted to thread within the sleeve 12, and each section being threaded a substantial part of its length, so as to provide telescoping threadedly adjustable sections.

Figure 3:
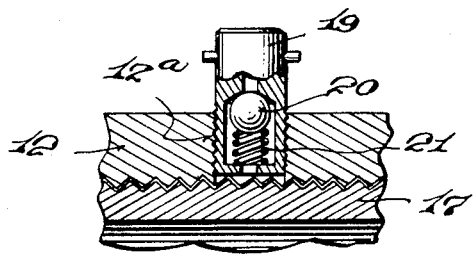
Figure 3 is a detail cross-sectional view, partly in elevation, of the valve connection included in the invention.

The sleeve section 12, which may be termed the female section of the extensible union, has a radial opening 12a for receiving a nipple 19 arranged to house a ball 20 and a spring 21 (see Figure 3), to provide an interiorly opening ball check valve for the insertion of a suitable sealing compound between the threaded portions of the sections 12 and 17.

Figure 2:
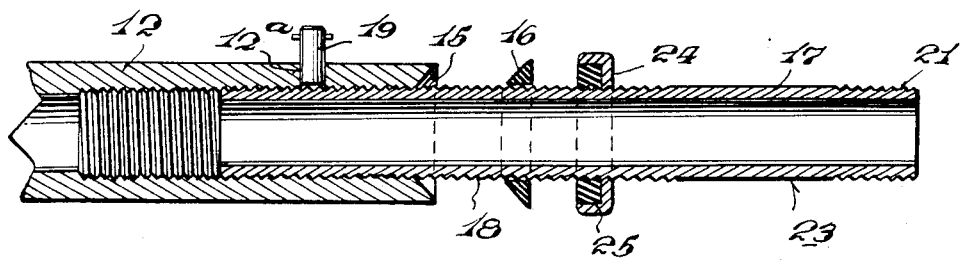
Figure 2 is a longitudinal view in cross section of the coupling showing the union uncoupled for adjustment between two spaced pipe ends.

The pipe section 17 may be provided on its extended end with threads 21 (see Figure 2) and if desired, be provided with a short unthreaded section 23 between the threads 21 and the threads 18.

In addition to the gasket 16, which may be of any suitable material, such, for example, as a synthetic rubber compound or the like, there is also threadedly mounted on the pipe section 17 a lock nut 24. The lock nut 24 is on the outer side of gasket 16 and is counterbored opposite to the gasket, so as to define an annular flange 26 with a bore for enclosing the gasket and pressing it tightly against the seat 15 on the end of pipe 12.

Assuming that it is desired to join adjacent sections, such as 8 and 9, of well pipe together, wherein said sections are too far apart to be coupled by the usual couplings, the nipple 13 is threaded into the end of the pipe section 8 and then the pipe section 17 is rotated out of the sleeve section 12 until its end male threads 21 engage with the female threads, not shown, of the other pipe section 9. Thus, as pipe section 17 of the union is threaded into its adjacent pipe section, the threads 18 on the other end of the pipe 17 will provide for feeding the pipe 17 outwardly from the bars of the female sleeve section 12. The gasket 16 and lock nut 24 during the first step of the coupling operation are backed off, so as to be clear of the end of sleeve 12 until the adjustable union has been extended and threaded into each oppositely disposed pipe end of the sections being joined together. After this has been done, the gasket 16 is threaded forwardly into engagement with the seat 15 on the sleeve 12, and the lock nut 24 then is threaded forwardly so as to compress the gasket 16 tightly against the seat 15 and into the interstices between the threads on the pipe 17.

The selected sealing compound may be forced under pressure through the valved nipple 19 into the interstices between the threads of the telescoping sections 12 and 17 either before or after the gland-type gasket is fitted in place. For example, if it is desired to make the joint gas tight while the members 12 and 17 are being adjusted, the fluid sealing compound may be forced in through the nipple 19, thus insuring a leak-proof connection while installation proceeds. On the other hand, the sealing compound may be inserted when installation is complete.

Thus, there is provided a novel extensible pipe union of relatively few inexpensive parts, which is easily installed, and which is provided with novel sealing means adapted to withstand extremely high pressures of fluid mediums, such as may be encountered in natural gas and oil well installations.

While the features of the present invention have been described and illustrated in considerable detail as an embodiment of only one form of the extensible union, other changes and modifications which will now appear to those skilled in the art, may be made without departing from the scope of the appended claims.

I claim:

1. In combination with a pair of suitably supported well pipe sections with internally threaded ends and having their ends aligned and spaced apart, an adjustable pipe union having each end thereof threaded exteriorly so as to thread within said internally threaded ends of said spaced pipe sections to bridge said space between the pipe sections, said union comprising a pair of threaded telescopic members, manually turnable means for longitudinally moving the said members relative to each other so as to accommodate them to the space between said pipe sections to be joined, means for sealing the said threaded telescopic members where their respective threads embrace each other, and means for locking the said members in their adjusted and sealed position after the said pipe sections have been joined together.

2. In combination with sections of aligned well tubing with internally threaded ends having their respective ends spaced apart at varying distances, an adjustable pipe union having each end thereof threaded exteriorly so as to thread within said internally threaded ends of said spaced tube sections to couple them together, said union comprising threaded telescopic members, said members upon relative rotation being threadedly extensible so as to accommodate them to bridge the space between the ends of said pipe sections, and means for locking said union in its adjusted position after it has been coupled to the spaced ends of said tubing.

3. An adjustable pipe union for joining spaced apart aligned sections of oil well tubing together, said sections having internally threaded ends, said union comprising a sleeve having an internally threaded end, an exteriorly threaded pipe section extending from the other end of said sleeve adapted to be threaded into the end of one of said spaced apart tube sections, a pipe exteriorly threaded on each end, one threaded end being adapted to turn in and out of said sleeve and the other threaded end being adapted to be threaded within the end of the other spaced apart tube section, and means for rotating the last mentioned pipe section to thereby accommodate different spaces between the spaced apart sections.

4. An adjustable pipe union for joining spaced apart sections of oil well tube together, said sections having internally threaded ends, said union comprising a sleeve having an internally threaded end, an exteriorly threaded pipe section extending from the other end of said sleeve adapted to be threaded into the end of one of said spaced apart tube sections, a pipe exteriorly threaded on each end, one threaded end being adapted to turn in and out of said sleeve and the other threaded end being adapted to be threaded within the end of the other spaced apart tube section, means for rotating the last mentioned pipe section to thereby accommodate different spaces between the spaced apart sections, a hollow nipple threaded through the sleeve including a tapered seating surface in the bore thereof, a coiled spring within the bore and a ball normally engaged against said seating surface to close the bore of said nipple until subjected to external pressure from a sealing medium to be forced in between the kerfs of the threads of the sleeve and the threaded end of the last mentioned pipe section.

WILLIAM P. MUSE.

REFERENCES CITED

The following references are of record in the file of this patent:

UNITED STATES PATENTS

| Number | Name | Date |
|---|---|---|
| 365,068 | Hendrick | June 21, 1887 |
| 1,371,041 | Maale | Mar. 8, 1921 |
| 1,800,085 | Kroeger | Apr. 7, 1931 |
| 2,039,912 | Leighton | May 5, 1936 |
| 2,209,939 | Schauer | July 30, 1940 |
| 2,254,502 | Thomas | Sept. 2, 1941 |
| 2,325,280 | Scherer | July 27, 1943 |

FOREIGN PATENTS

| Number | Country | Date |
|---|---|---|
| 341,820 | France | 1904 |